United States Patent
Kharitidi et al.

(10) Patent No.: US 7,603,654 B2
(45) Date of Patent: Oct. 13, 2009

(54) DETERMINING XML SCHEMA TYPE EQUIVALENCE

(75) Inventors: Elena A. Kharitidi, Sammamish, WA (US); John Koropchak, Kirkland, WA (US); Yasser Shohoud, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 728 days.

(21) Appl. No.: 10/790,423

(22) Filed: Mar. 1, 2004

(65) Prior Publication Data

US 2005/0192990 A1     Sep. 1, 2005

(51) Int. Cl.
    *G06F 9/44* (2006.01)
(52) U.S. Cl. ...................................................... 717/106
(58) Field of Classification Search .................. 717/106
    See application file for complete search history.

(56) References Cited

U.S. PATENT DOCUMENTS

| | | | |
|---|---|---|---|
| 2002/0038320 A1* | 3/2002 | Brook | 707/513 |
| 2004/0013307 A1* | 1/2004 | Thienot et al. | 382/232 |
| 2004/0054692 A1* | 3/2004 | Seyrat et al. | 707/104.1 |
| 2004/0064826 A1* | 4/2004 | Lim et al. | 719/319 |
| 2004/0073870 A1* | 4/2004 | Fuh et al. | 715/513 |
| 2004/0098667 A1* | 5/2004 | Atkinson | 715/513 |
| 2004/0268237 A1* | 12/2004 | Jones et al. | 715/513 |

OTHER PUBLICATIONS

"XML Schema Part 1: Structures" W3C Recommendation May 2, 2001, retrieved from http://www.w3.org/TR/2001/REC-xmlschema-1-20010502/#cParticles pp. 1-9.*

Erhard Rahm, Philip A. Bernstein, "A survey of approaches to automatic schema matching", Dec. 2001, The VLDB Journal—The International Journal on Very Large Data Bases, vol. 10 Issue 4 Publisher: Springer-Verlag New York, Inc., pp. 334-350.*

Harold Boley, "The Rule Markup Language: RDF-XML Data Model, XML Schema Hierarchy, and XSL Transformations", Web Knowledge Management and Decision Support, 14th International Conference on Applications of Prolog, Oct. 2001, pp. 5-22.

Boris Chidlovskii, "Schema Extraction from XML Collections", Proceedings of the Second ACM/IEEE-CS Joint Conference on Digital Libraries, Jul. 2002, pp. 291-292.

Samuel Robert Collins et al., "XML Schema Mappings for Heterogeneous Database Access", Information and Software Technology, vol. 44, No. 4, Mar. 31, 2002, pp. 251-257.

(Continued)

*Primary Examiner*—Wei Y Zhen
*Assistant Examiner*—Philip Wang
(74) *Attorney, Agent, or Firm*—Workman Nydegger (57) ABSTRACT

XML schema types can be identified and compared for equivalence so as to avoid unnecessary and undesirable creation of multiple classes for equivalent schema types. XML schema types having the same name are identified and normalized according to a unified system for representing schema types. The step for normalizing schema types can include any writing and/or rewriting at least a portion of the schema types into a common unifying format so that they can be compared. Once the schema types have been normalized, they are then compared for equivalence. One technique for comparing the schema types is to create and compare hash numbers of all or only selected portions of the normalized schema types. Equivalent schema types can then be indexed to share a single class, thereby avoiding the creation of multiple classes for equivalent schema types.

23 Claims, 4 Drawing Sheets

OTHER PUBLICATIONS

Hong-Hai Do, et al., "Comparison of Schema Matching Evaluations", NODe 2002 Web- and Database-Related Workshops, Revised Papers, vol. 2593, Oct. 2002, pp. 221-237.

Sun Hongwei et al., "Mapping XML-Schema to Relational Schema", EurAsia-ICT 2002: Information and Communication Technology, First EurAsian Conference, Proceedings, Oct. 2002, pp. 322-329.

Murali Mani et al., "XML to Relational Conversion Using Theory of Regular Tree Grammars", Efficiency and Effectiveness and XML Tools and Techniques and Data Integration over the Web (Lecture Notes in Computer Science vol. 2590), Dec. 2002, pp. 81-103.

Yan-Feng Zhang et al., "Semantic Integration of XML Schema", Proceedings of 2002 International Conference on Machine Learning and Cibernetics, vol. 2, Nov. 2002, pp. 1058-1061.

* cited by examiner

*Fig. 1*

```
<xs:schema targetNamespace="http://tempuri.org/exampleOrder"
    elementFormDefault="unqualified"
    xmlns:xs="http://www.w3.org/2001/XMLSchema">
  <xs:complexType name="Order">
    <xs:all>
      <xs:element name="OrderId" type="xs:string"
          maxOccurs="1" minOccurs="1"/>
      <xs:element name="CustomerId" type="xs:string"
          nillable="false">
      </xs:element>
    </xs:all>
  </xs:complexType>
</xs:schema>
```
— 110

150 — elementFormDefault="unqualified"
152 — xmlns:xs="http://www.w3.org/2001/XMLSchema"
130 — targetNamespace / complexType name="Order"
170 — OrderId element
190 — maxOccurs="1" minOccurs="1"
172 — CustomerId element
192 — nillable="false"

```
<s:schema targetNamespace='http://tempuri.org/exampleOrder'
    elementFormDefault='unqualified'
    xmlns:s='http://www.w3.org/2001/XMLSchema'>
  <s:complexType name='Order'>
    <s:all>
      <s:element name='CustomerId' type='s:string'
          form='unqualified' />
      <s:element name='OrderId' type='s:string'
          form='unqualified' />
    </s:all>
  </s:complexType>
</s:schema>
```
— 120

160 — elementFormDefault='unqualified'
162 — xmlns:s='http://www.w3.org/2001/XMLSchema'
140 — targetNamespace / complexType name='Order'
180 — CustomerId element
194 — form='unqualified'
182 — OrderId element
196 — form='unqualified'

Fig. 2

```
<xs:complexType name="Data">
    <xs:all>
220 ─── <xs:element minOccurs="1" maxOccurs="1" name="i" type="xs:int" />
222 ─── <xs:element minOccurs="0" maxOccurs="1" name="s" type="xs:string" />
224 ─── <xs:element minOccurs="0" maxOccurs="1" name="List" type="Data" />
    </xs:all>                      └─ 226
</xs:complexType>
```
⎫
⎬ 200
⎭

```
<xs:complexType name="Data">
    <xs:all>
240 ─── <xs:element minOccurs="0" maxOccurs="1" name="List" type="Data" />
242 ─── <xs:element minOccurs="1" maxOccurs="1" name="i" type="xs:int" />
244 ─── <xs:element minOccurs="0" maxOccurs="1" name="s" type="xs:string" />
    </xs:all>                      └─ 246
</xs:complexType>
```
⎫
⎬ 230
⎭

```
<xs:complexType name="Data">
    <xs:all>
260 ─── <xs:element minOccurs="1" maxOccurs="1" name="i" type="xs:int" />
262 ─── <xs:element minOccurs="0" maxOccurs="1" name="List" type="Data" />
264 ─── <xs:element minOccurs="0" maxOccurs="1" name="s" type="xs:string" />
    </xs:all>
</xs:complexType>
```
⎫
⎬ 250
⎭

*Fig. 3*

DETERMINING XML SCHEMA TYPE EQUIVALENCE

BACKGROUND OF THE INVENTION

1. The Field of the Invention

The present invention relates to methods and systems utilizing eXtensible Markup Language (XML) documents and services and, more particularly, to methods and systems for determining type equivalence between different XML schemas.

2. Background and Relevant Art

XML schemas are well-known in the computing industry. They can be used, for example, to define XML documents in a structured format so that corresponding XML data can be shared and accessed by generic applications. XML schemas can be processed by various programs to generate code for accessing the XML data. For example, a program can analyze a schema and create classes that can be used for extracting and utilizing the XML data, as defined by the schema types. In other words, an XML schema can be thought of as input and the resulting code and classes that are used to extract and utilize the XML data can be thought of as the output.

With specific regard to the Internet, many applications expose multiple Web services that share a subset of schema types as defined in the services' Web Service Description Language (WSDL) contract. A consumer of such services will want to share the equivalent types between Web service proxies generated from the WSDL. To solve this problem one must solve the problem of determining equivalence of types, as defined in the consumed Web services' contract. This, however, is easier said than done because XML grammar for defining schema types includes the ability to define defaults at various scopes, certain insensitivities to order, and permissible annotations. These variations can thereby cause two different schema type definitions to yield equivalent schema types. In addition, XML schema documents are typically serialized to XML 1.0 which introduces yet another set of variations due to the XML 1.0 serialization rules.

Figure 1:
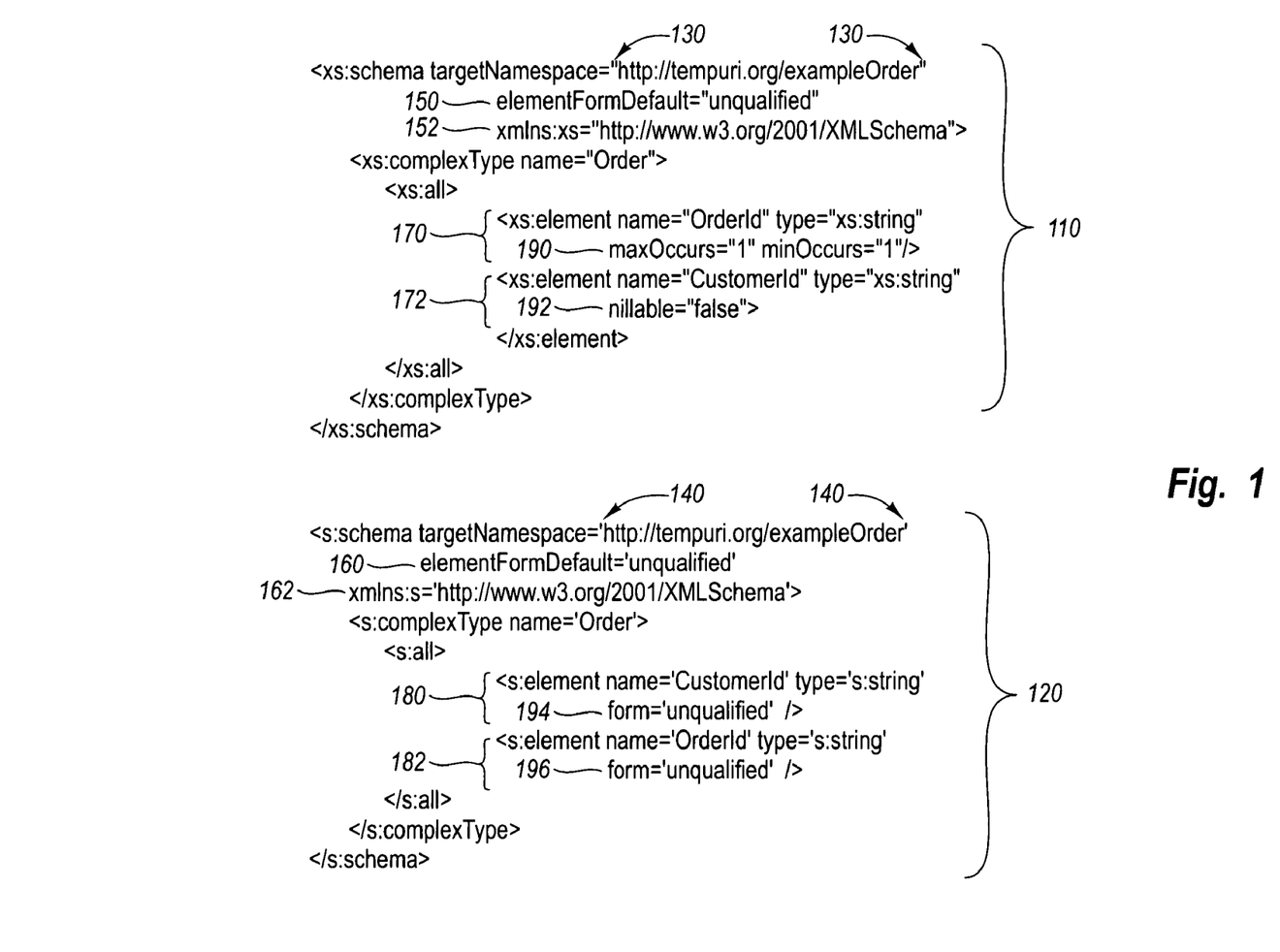
FIG. 1 illustrates two examples of XML schema types.

For example, FIG. 1 illustrates two examples 110 and 120 of equivalent schema type definitions for the same type, named Order. Initially, it will be noted that the syntax can be altered between equivalent schema types. For instance, example 110 includes a target namespace reflected in double quotations 130, while example 140 includes the same target namespace reflected in single quotations 140.

In the present examples 110 and 120, the indentation and spacing is also different. For instance the indentation of definition lines 150 and 152 is more uniform and pronounced than the indentation of corresponding definition lines 160 and 162.

The presentation order of the type definitions 170 and 172 from the first example 110 is also inconsistent with the presentation order of the corresponding type definitions 180 and 182 for the second example 120.

Finally, FIG. 1 also illustrates how various components of the schema types are discretionary and can be included or omitted, such as, for example, the components found in lines 190, 192, 194 and 196.

Accordingly, it has been shown how certain components of equivalent schema types can be presented differently. Because of this, it is important to identify the equivalent types so that only a single class is created for equivalent types within the shared schemas that are being consumed by the applications. Otherwise, the applications utilizing the redundant classes will become incompatible or fail to run properly. Similarly, it is important that different schema types are not identified by the same name, or else they will also fail to run properly.

For example, consider a situation in which there are two different schemas, a payroll schema and a human resource schema. In this example, the schemas include employee types that are equivalent, but not identical, and that will ultimately be used to create corresponding employee classes for accessing employee data. However, because the employee schema types are not identical, two different classes will be created, instead of only one. This creation of duplicate classes not only represents wasted resources, it can also cause some programs to fail, depending on how the data is being accessed and used.

These problems can become even more pronounced when considering that the schemas can change over time as customers customize their programs with new type definitions to accommodate new functionality and when applications are configured to consume or utilize additional schemas. Furthermore, when considering that the W3C permits the creation of custom schema types, it is also apparent that there is room for a large quantity of equivalent schema types to be created. In particular, although there are certain defaults for creating custom types, there is also a lot of flexibility for creating and defining equivalent types differently.

For at least the foregoing reasons, it should be apparent that it would be desirable to determine which schema types are equivalent prior to creating the classes from the schemas, so as to avoid creating multiple classes for equivalent schema types. Unfortunately, equivalence cannot be determined by merely looking at the names or definitions of the schema types because of the many different ways equivalent schema types can be represented.

Accordingly, it is currently necessary for a customer having problems resulting from the creation of multiple classes for equivalent schema types to edit the code created from the XML schema(s) so that only one type of definition exists and to delete the redundant secondary class(es). This, however, is cumbersome and is analogous to putting out a fire only after you have been burned.

Accordingly, there is currently a need in the art for techniques to determine equivalence between schema types and to prevent the fire from even starting.

BRIEF SUMMARY OF THE INVENTION

The present invention is generally directed to methods, systems and computer program products for determining equivalence of XML schema types.

According to one embodiment, two or more XML schema types are identified. In order to determine whether they are equivalent, it is first determined whether they have the same qualified name. Thereafter, XML schema types having the same qualified name are normalized according to a unified system for representing schema types.

The step for normalizing the schema types can include any acts of writing or rewriting components of the schema. For example, normalizing the schema types can include, but is not limited to, such things as writing missing discretionary components, ordering components in a particular order, such as an alphabetical order, stripping or modifying formatting white spaces, modifying syntax, etc. It will be appreciated, however, that because there are virtually an infinite number of formats and techniques for normalizing disparately defined schema types and definitions, the presented invention is not limited to any particular normalizing format or technique specifically referred to herein. Rather, the invention extends more broadly to any method or systems in which equivalent schema types are normalized by writing or rewriting at least a portion of the equivalent schema types into a common unifying format so that they can be compared.

Once the schema types have been normalized, they are then compared for equivalence. One technique for comparing the schema types is to create and compare hash numbers of all or only selected portions of the normalized schema types. It will be appreciated, however, that essentially any comparison technique can be used.

If it is determined that the schema types are equivalent, they can then be indexed and used to create a single class, rather than multiple classes for each of the equivalent schema types.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems and computer program products for determining equivalence of XML schema types.

Certain definitions will now be provided to assist in the interpretation of the invention, as described and claimed herein.

The term "XML schema," as defined herein, should be broadly construed to include any XML structure configured to define the building blocks of an XML document and that includes at least one schema type. Accordingly, although the present application includes references and claims directed specifically to W3C XML Schemas, it will be appreciated that the scope of the invention extends even more broadly to any data structure that can be used to define XML types and data.

The term "schema type," as defined herein, should be broadly construed to include the portion of an XML schema that is used to create a class for subsequent application to XML data. Schema types, which are well-known to those of skill in the art can include, but are not limited to string types, decimal types, integer types, Boolean types, date types, time types, and all of which can be written in different formats. As described herein, the term schema types can include both complex and simple types.

The term "XML" data generally refers to any data that can be utilized or referenced in a XML document. XML data can include essentially any data stored in an XML format.

The term "component," which is used in relation to the definitional components of a schema type, can include, but are not limited to type definitions, attributes, children, particles, names, elements, formatting and syntax. Components are also described herein as sometimes being discretionary or interchangeable. In other words, some components can be presented in different formats or not at all, without affecting the definition of a type. Accordingly, multiple equivalent schema types can have similar or dissimilar discretionary components that can be normalized into a single unified form. The discretionary components may or may not affect a determination of equivalence, as described herein, depending on how the defaults are set.

The term "normalizing," as described herein, refers to writing or rewriting components of the schema types into a single unified format.

As further described herein, embodiments of the present invention can include special purpose and general-purpose computing devices including various computer hardware and software, as discussed in greater detail below. The embodiments within the scope of the present invention can also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means or modules in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Embodiments of the invention for determining equivalence of schema data types will now be described with particular reference to FIGS. 1-4.

FIG. 1, which was described above, illustrates two examples of equivalent XML schema types named Order. As described, this Figure has been provided to illustrate how equivalent XML schema types can have various components that are presented in different formats. In fact, some components may be discretionary components that are not explicitly recited at all. Because of this, multiple classes are often created to represent the same data, thereby wasting computing resources and potentially creating problems with the applications accessing the data. Accordingly, there is a need to determine the equivalence of schema types before the classes are created so that a single class can be created and assigned to the equivalent schema types. Otherwise, a customer will have to edit the code created by the schema to propagate one of the classes throughout the code, and delete the other.

Figure 2:
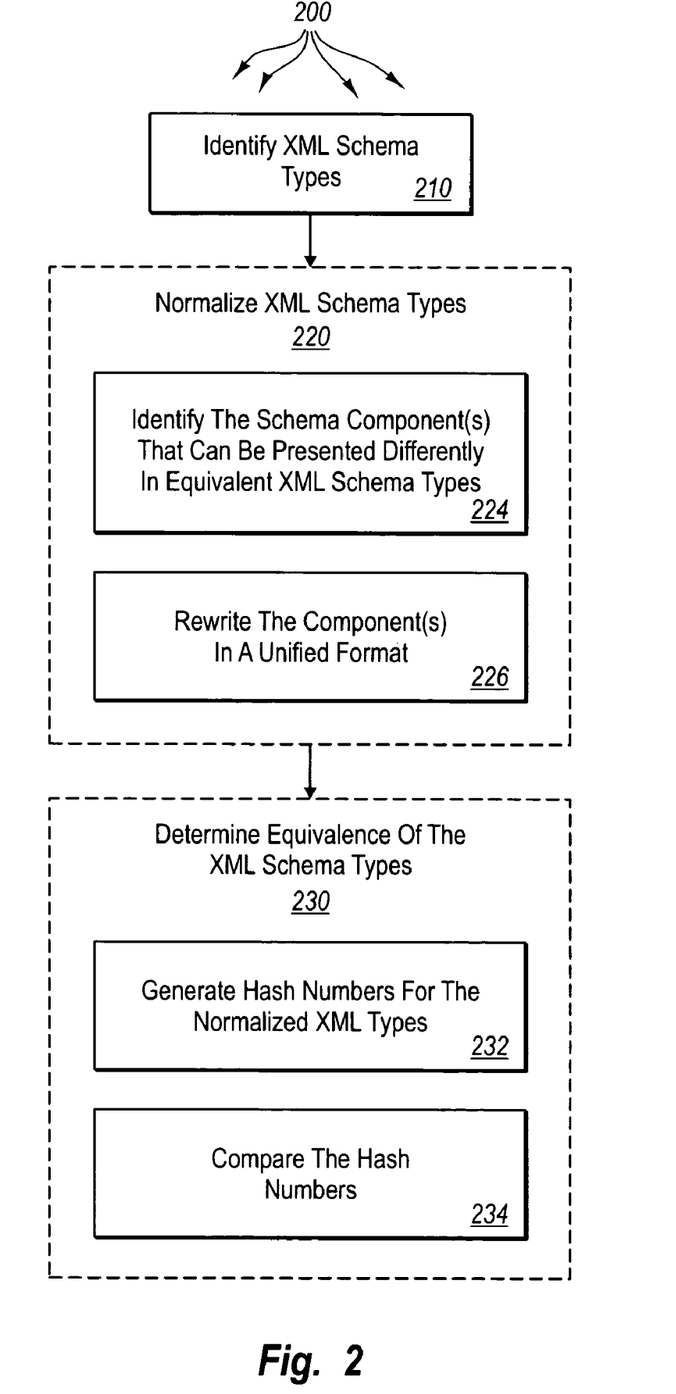
FIG. 2 illustrates a flowchart of one embodiment of a method for determining equivalence of XML schema types.

FIG. 2 illustrates a flowchart of one embodiment of a method for determining equivalence of XML schema types. As shown, the method includes various acts and steps that can be performed, for example, by the modules of a computing system.

The first illustrated act includes identifying XML schema types that are to be compared for equivalence. This can be performed, for example, by loading one or more schemas having one or more schema types and scanning for schema types having the same name or qname. For example, with reference to FIG. 1, the two schema types each contain the same qname, which essentially comprises the combination of the targetNamespace (http://tempuri.org/exampleOrder) and complextype name (Order). In some circumstances, however, only the name is used to identify XML schema types to be compared. This can be is useful, for example, when equivalent schema types are referenced at different places, such as different WSDL (Web Service Description Language) contracts.

Next, the method includes the step for normalizing the identified XML schema types (step 220). As mentioned above, the step for normalizing can include various different techniques and formulas. Accordingly, it will be appreciated that the invention is not limited to any particular normalizing technique or formula. In fact, it is not even necessary the entire XML schema type be normalized. Accordingly, in some embodiments, only one or more discrete portions of the XML schema types are normalized.

The step for normalizing essentially comprises writing or rewriting one or more portions of the XML schema type into a unifying format, such that each of two or more different schema types to be compared are written into the same format. The step for normalizing is recited in means plus function language. Accordingly, it will be appreciated that the step for normalizing can be performed by performing any combination of corresponding acts that are sufficient for writing/rewriting at least a portion of the identified XML schema types into a unifying format.

According to the illustrated embodiment, the step for normalizing (step 220) includes the corresponding acts of identifying the one or more schema components that can be presented differently in equivalent XML schema types (act 224) and rewriting the components in a unified format (act 225).

The act of identifying the one or more schema components that can be presented differently in equivalent XML schema types (act 224) can include, but is not limited to such things as identifying discretionary components or definitions that are explicitly recited or omitted and identifying a plurality or list of components (e.g., attributes, children, etc.) that are written in a particular order. In order to perform these acts, a computing module can be configured to look for particular patterns or key terms. The schema can also be written to an object model, so as to facilitate the search for particular known objects.

The act of rewriting the components (act 226), once they are identified (act 224), can also include rewriting a group or list of components into a predetermined order, such as an alphabetical or numerical order. Rewriting the components can also include omitting white formatting spaces, deleting/omitting discretionary components that were included in the schema type definitions, writing discretionary components that were missing, and modifying certain syntax.

Figure 3:
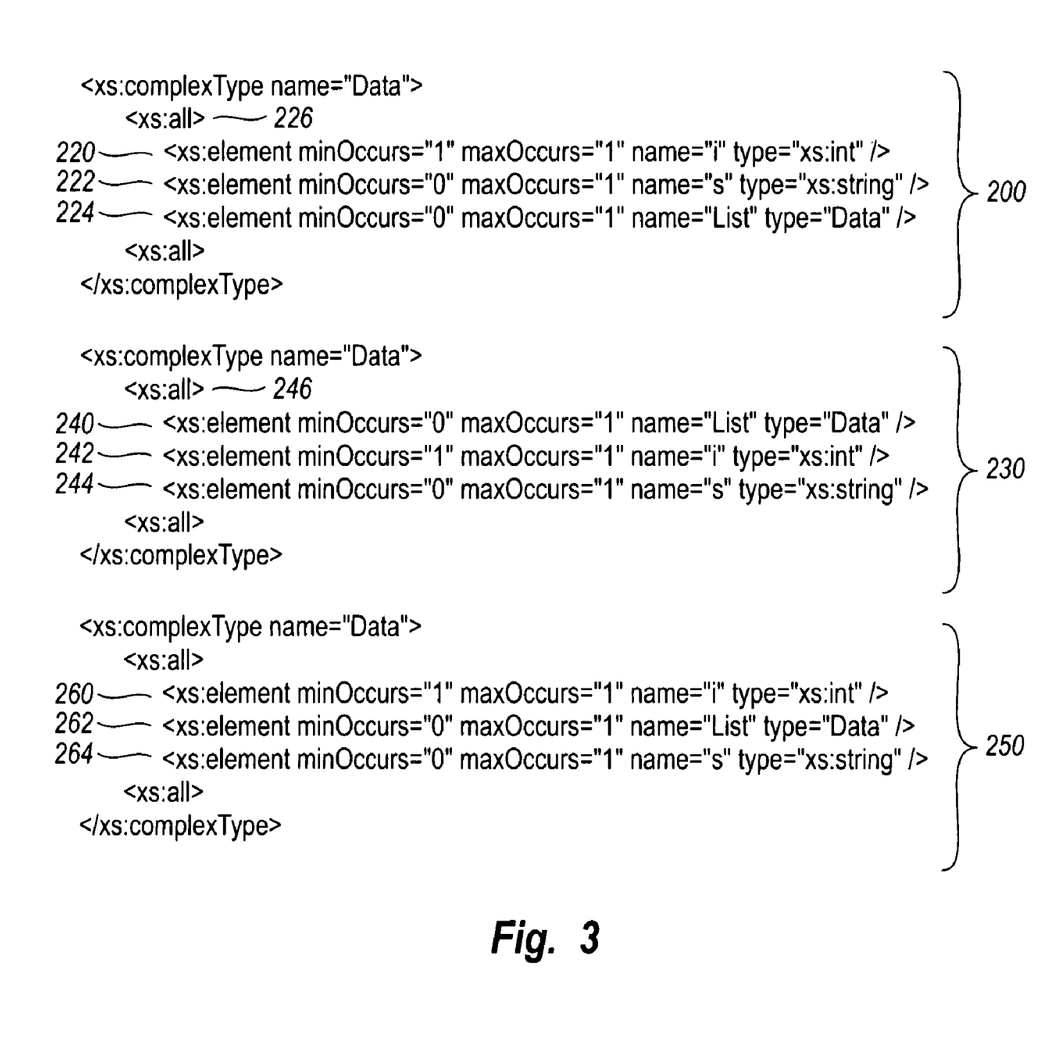
FIG. 3 illustrates three embodiments of three XML schema types having children represented in different order.

FIG. 3 illustrates one example, in which two equivalent XML schema types having children represented in different sequence/order can be normalized into a common format.

As shown, a first schema type 200, named Data, includes three children components 220, 222 and 224, providing min and max values for other named types I, s and list, respectively. Inasmuch as the enclosing particle 226 does not specify or reflect any significance to the order of the children 220, 222 and 224, it should be appreciated that the listed order of the children 220, 222, and 224 is arbitrary or discretionary.

Likewise, the second schema type, 230, also named Data, has three corresponding children components 240, 242 and 244, each of which are identical to the corresponding children 220, 222 and 224 of the first schema type 200, only presented in a different order. Their sequence is also discretionary, however, inasmuch as the enclosing particle 246 does not designate or require a particular order. Other examples of enclosing particles that do not require a particular order include <any> and <choice>.

When order is not required, a normalizing function can be applied to the schema types 200 and 230 so that the identified children components are rewritten into a predetermined format, such as the alphabetical format reflected by normalized schema type 250, in which children 260, 262 and 264 are alphabetized by name. This, however, is merely illustrative of one technique in which the schema types can be normalized. Other techniques and formulas can also be applied to normalize the definitions or components in different ways.

If, however, a particular order is required, as could be designated by an enclosing particle <sequence>, the normalizing function should avoid altering the recited order of the components. Likewise, if the component presence or syntax is absolutely required, a normalizing function should avoid omitting that component or altering the syntax.

Once the schema types are normalized into a unified format, they can be compared to each other directly or indirectly, in entirety or partially, to determine their equivalence (step 230). For example, according to one embodiment, a hash number is created (act 232) for the normalized XML schema types by applying a simple hashing algorithm to the schema types (either in their entirety, or any portion(s) thereof). Thereafter, the hash numbers can be compared (act 234). If the hash numbers are the same, it is determined that the schema types are equivalent. Likewise, if the hash numbers differ, it can be determined that the schema types are not equivalent.

It will be appreciated, however, that step 230 can also be performed through other corresponding acts, such as, for example, comparing two or more components textually, by bit size, or by any other technique. What is important is that the equivalence is determined by comparing the XML schema types, or at least certain portions of the schema types, only after they have been normalized.

Thereafter, if equivalence is determined, the equivalent schema types can be indexed for future reference, and such that only a single class is created by the applications utilizing the schemas that include the equivalent schema types.

If equivalence is not determined, then it may be necessary to create a new class for each of the schema types. Alternatively, it may be necessary to continue comparing one or more of the schema types with additional schema types until all of the schema types within the applicable schemas have been exhausted.

In summary, it will be appreciated that the present invention provides methods and systems for determining equivalence of XML schema types and in such a way as to overcome many of the problems associated with the prior art. In particular, it should be apparent that by practicing the invention it is possible to avoid the creation of multiple classes from equivalent schema types, thereby saving computing resources and enabling some applications to utilize multiple schemas and to share XML data without crashing due to having too many classes that are associated with the same data.

Computing Environment

The various acts and steps that have been described above can be performed by any number of computing modules and systems and network computing environments with various configurations, including personal computers, hand-held devices, multi-processor systems, microprocessor-based or programmable consumer electronics, network PCs, mini-computers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 4:
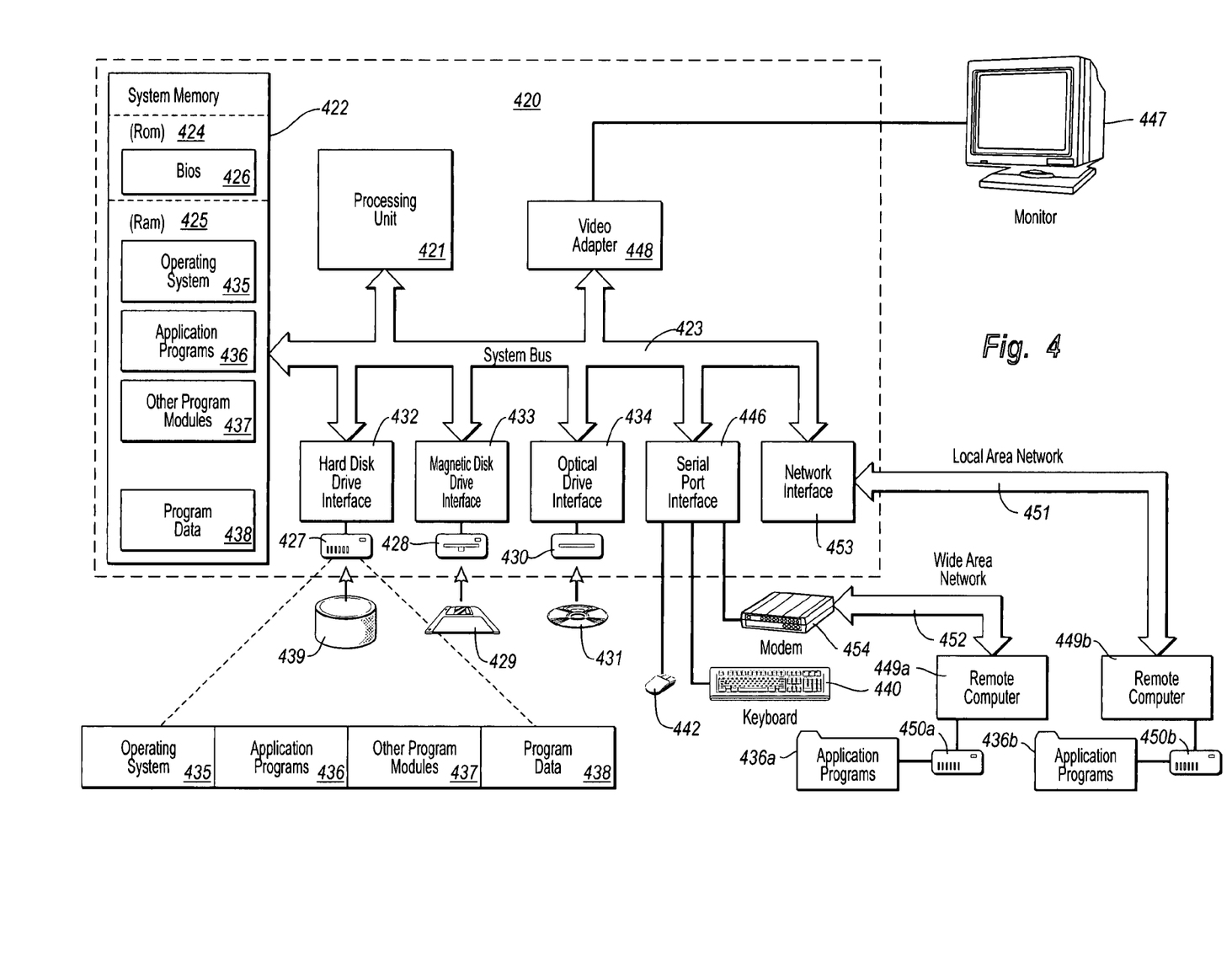
FIG. 4 illustrates a block diagram of one embodiment of a computing environment that may be used while performing methods of the invention.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM, DVD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system including a processor and system memory, a method for determining equivalence of XML schema types, the method being performed by a system configured to generate code from XML schemas, the method comprising:

an act of identifying a first XML schema type, the first XML schema type providing a representation of first schema components;

an act of identifying a second XML schema type for which equivalence to the first schema type is to be determined, the second XML schema type providing a representation of second schema components, the representation of second schema components differing from the representation of the first schema components such that presentation of the first schema components and the second schema components is insufficient to determine if the first and second XML schema types are equivalent XML schema types;

a step for the processor normalizing the first XML schema type into a normalized first XML schema type in a unified schema format, normalization of the first XML schema type including:

identifying one or more schema components in the first schema components that can be equivalently presented in the unified schema format, the unified schema format differing for the format of both the first and second XML schema types, identifying one or more components in the first schema components including:

identifying any discretionary components in the first schema components that are expressly recited;

identifying any discretionary components in the first schema components that are expressly omitted; and identifying one or more list of components in the first schema components that are written in a particular order; and rewriting the first XML schema type into the unified schema format, including a) at least one of deleting a discretionary component from the first XML schema type that was that as expressly recited in the first XML schema type and writing a discretionary component to the first XML schema type that was expressly omitted in the first XML schema type and b) rewriting the order of at least one list of components in the first XML schema type into a different predetermined order of the unified format;

a step for the processor normalizing the second XML schema type into a normalized second XML schema type in the unified schema format, normalization of the second XML schema type including:

identifying one or more schema components in the second schema components that can be equivalently presented in the unified schema format, identifying one or more components in the first schema components including:

identifying any discretionary components in the second schema components that are expressly recited;

identifying any discretionary components in the second schema components that are expressly omitted; and identifying one or more list of components in the second schema components that are written in a particular order; and rewriting the second XML schema type into the unified schema format, including a) at least one of deleting a discretionary component from the second XML schema type that as expressly recited in the second XML schema type and writing a discretionary component to the second XML schema type that was expressly omitted in the second XML schema type and b) rewriting the order of at least one list of components in the second XML schema type into a different predetermined order of the unified format;

a step for determining that the first and second normalized XML schema types are equivalent, including comparing the schema components of the first normalized XML schema type to the schema components of the second normalized XML schema type; and an act of creating a single class collectively representing both the first XML schema type and the second XML schema type based on the determination of equivalence and not withstanding that the representation of second schema components differ from the representation of the first schema components, the single class compatible with applications utilizing either the first XML schema type or the second XML schema type.

2. The method as recited in claim 1, wherein the step for determining that the first and second XML schema types are equivalent includes creating and comparing hash numbers of corresponding portions of the first XML schema type and the second XML schema type.

3. The method as recited in claim 1, wherein the step for creating a single class collectively representing both the first XML schema type and the second XML schema type comprises an act of creating a class from the normalized first XML schema type.

4. The method as recited in claim 3, wherein rewriting the order of at least one list of components in the first XML schema type includes altering an order of at least two schema components within the first XML schema type.

5. The method as recited in claim 4, wherein altering the order includes placing the at least two schema components into alphabetical order.

6. The method as recited in claim 4, wherein altering the order includes placing the at least two schema components into numerical order.

7. The method as recited in claim 4, wherein the at least one component is a discretionary component that is not explicitly recited in the first XML schema type.

8. The method as recited in claim 1, wherein creating a single class for applications utilizing either the first XML schema type or the second XML schema comprises creating a single class that is used interchangeably by the applications so as to enable applications using either the first XML schema or the second XML schema type to share data.

9. A computer program product for use at a computer system, the computer program product for implementing a method for determining equivalence of XML schema types, the computer program product comprising one or more computer-readable media having stored thereon computer-executable instructions that, when executed at a processor, cause the computer system to perform the method for determining equivalence of XML schema types, including the following:

identify a first XML schema type, the first XML schema type providing a representation of first schema components;

identify a second XML schema type for which equivalence to the first schema type is to be determined, the second XML schema type providing a representation of second schema components, the representation of second schema components differing from the representation of the first schema components such that presentation of the first schema components and the second schema components is insufficient to determine if the first and second XML schema types are equivalent XML schema types;

normalize first XML schema type into a normalized first XML schema type in a unified schema format, normalization of the first XML schema type including:

identifying one or more schema components in the first schema components that can be equivalently presented in the unified schema format, the unified schema format differing for the format of both the first and second XML schema types, identifying one or more components in the first schema components including:

identifying any discretionary components in the first schema components that are expressly recited;

identifying any discretionary components in the first schema components that are expressly omitted; and identifying one or more list of components in the first schema components that are written in a particular order; and rewriting the first XML schema type into the unified schema format, including a) at least one of deleting a discretionary component from the first XML schema type that was that as expressly recited in the first XML schema type and writing a discretionary component to the first XML schema type that was expressly omitted in the first XML schema type and b) rewriting the order of at least one list of components in the first XML schema type into a different predetermined order of the unified format;

normalize the second XML schema type into a normalized second XML schema type in the unified schema format, normalization of the second XML schema type including:

identifying one or more schema components in the second schema components that can be equivalently presented in the unified schema format, identifying one or more components in the first schema components including:

identifying any discretionary components in the second schema components that are expressly recited;

identifying any discretionary components in the second schema components that are expressly omitted; and identifying one or more list of components in the second schema components that are written in a particular order; and rewriting the second XML schema type into the unified schema format, including a) at least one of deleting a discretionary component from the second XML schema type that as expressly recited in the second XML schema type and writing a discretionary component to the second XML schema type that was expressly omitted in the second XML schema type and b) rewriting the order of at least one list of components in the second XML schema type into a different predetermined order of the unified format;

determine equivalence of the first and second normalized XML schema types, including comparing the schema components of the first normalized XML schema type to the schema components of the second normalized XML schema type; and create a single class collectively representing both the first XML schema type and the second XML schema type based on the determination of equivalence and notwithstanding that the representation of second schema components differ from the representation of the first schema components, the single class compatible with applications utilizing either the first XML schema type or the second XML schema type.

10. The computer program product as recited in claim 9, wherein computer-executable instructions that, when executed, cause the computer system to determine that the first and second XML schema types are equivalent comprise computer-executable instructions that, when executed, cause the computer system to create and compare hash numbers of corresponding portions of the first XML schema type and the second XML schema type.

11. The computer program product as recited in claim 9, wherein computer-executable instructions that, when executed, cause the computer system to create a single class collectively representing both the first XML schema type and the second XML schema type comprise computer-executable instructions that, when executed, cause the computer system to create a class from the normalized first XML schema type.

12. At a computer system including a processor and system memory, a method for determining equivalence of XML schema types in a system configured to generate code from XML schemas, the method comprising:

an act of identifying a first XML schema type, the first XML schema type providing a representation of first schema components;

an act of identifying a second XML schema type for which equivalence to the first schema type is to be determined, the second XML schema type providing a representation of second schema components, the representation of second schema components differing from the representation of the first schema components such that presentation of the first schema components and the second schema components is insufficient to determine if the first and second XML schema types are equivalent XML schema types;

an act of the processor normalizing the first XML schema type into a normalized first XML schema type in a unified schema format, normalization of the first XML schema type including:

identifying one or more schema components in the first schema components that can be equivalently presented in the unified schema format, the unified schema format differing for the format of both the first and second XML schema types, identifying one or more components in the first schema components including:

identifying any discretionary components in the first schema components that are expressly recited;

identifying any discretionary components in the first schema components that are expressly omitted; and identifying one or more list of components in the first schema components that are written in a particular order; and rewriting the first XML schema type into the unified schema format, including a) at least one of deleting a discretionary component from the first XML schema type that was that as expressly recited in the first XML schema type and writing a discretionary component to the first XML schema type that was expressly omitted in the first XML schema type and b) rewriting the order of at least one list of components in the first XML schema type into a different predetermined order of the unified format;

an act of the processor normalizing the second XML schema type into a normalized second XML schema type in the unified schema format, normalization of the second XML schema type including:

identifying one or more schema components in the second schema components that can be equivalently presented in the unified schema format, identifying one or more components in the first schema components including:

identifying any discretionary components in the second schema components that are expressly recited;

identifying any discretionary components in the second schema components that are expressly omitted; and identifying one or more list of components in the second schema components that are written in a particular order; and rewriting the second XML schema type into the unified schema format, including a) at least one of deleting a discretionary component from the second XML schema type that as expressly recited in the second XML schema type and writing a discretionary component to the second XML schema type that was expressly omitted in the second XML schema type and b) rewriting the order of at least one list of components in the second XML schema type into a different predetermined order of the unified format;

an act of generating a first hash number for at least a portion of the first normalized XML schema type;

an act of generating a second hash number for at least a corresponding portion of the second normalized XML schema type; and an act of the processor determining equivalence of the first and second normalized XML schema types by comparing the first and second hash numbers and wherein when the first and second hash numbers match then the first and second XML schema types are indicated as being equivalent; and an act of creating a single class collectively representing both the first XML schema type and the second XML schema type based on the determination of equivalence and not withstanding that the representation of second schema components differ from the representation of the first schema components, the single class compatible with applications utilizing either the first XML schema type or the second XML schema type.

13. The method as recited in claim 12, wherein rewriting at least one schema component in the representation of first schema component includes rewriting an existing schema component into a new format.

14. The method as recited in claim 12, wherein rewriting the order of at least one list of components in the first XML schema type includes altering an order of at least two schema components within the first XML schema type.

15. The method as recited in claim 14, wherein altering the order includes placing the at least two schema components into alphabetical order.

16. The method as recited in claim 14, wherein altering the order includes placing the at least two schema components into numerical order.

17. The method as recited in claim 12,
wherein creating a single class collectively representing both the first XML schema type and the second XML schema type comprises creating a based on the normalized first XML schema type, the single class used interchangeably by applications exchanging data defined in accordance with either the first XML schema type or the second XML schema type.

18. The method as recited in claim 12, wherein at least one of the fist schema components is a schema particle definition.

19. The method as recited in claim 12, wherein at least one of the fist schema components is a schema attribute.

20. The method as recited in claim 12, wherein at least one of the fist schema components is at least one of a child and a sub-child of a named type.

21. A computer program product for use at a computer system, the computer program product for implementing a method for determining equivalence of XML schema types, the computer program product comprising one or more computer-readable media having computer-executable instructions that, when executed at a processor, cause the computer system to implement the method for determining equivalence of XML schema types, including the following:
identify a first XML schema type, the first XML schema type providing a representation of first schema components;
identify a second XML schema type for which equivalence to the first XML schema type is to be determined, the second XML schema type schema components, the representation of second schema components differing from the representation of the first schema components such that presentation of the first schema components and the second schema components is insufficient to determine if the first and second XML schema types are equivalent XML schema types;

normalize the first XML schema type into a normalized first XIML schema type in a unified schema format, normalization of the first XML schema type including:
identifying one or more schema components in the first schema components that can be equivalently presented in the unified schema format, the unified schema format differing for the format of both the first and second XML schema types, identifying one or more components in the first schema components including:
identifying any discretionary components in the first schema components that are expressly recited;
identifying any discretionary components in the first schema components that are expressly omitted; and
identifying one or more list of components in the first schema components that are written in a particular order; and
rewriting the first XML schema type into the unified schema format, including a) at least one of deleting a discretionary component from the first XML schema type that was that as expressly recited in the first XML schema type and writing a discretionary component to the first XML schema type that was expressly omitted in the first XML schema type and b) rewriting the order of at least one list of components in the first XML schema type into a different predetermined order of the unified format;

normalize the second XML schema type into a normalized second XML schema type in the unified schema format, normalization of the second XML schema type including:
identifying one or more schema components in the second schema components that can be equivalently presented in the unified schema format, identifying one or more components in the first schema components including:
identifying any discretionary components in the second schema components that are expressly recited;
identifying any discretionary components in the second schema components that are expressly omitted; and
identifying one or more list of components in the second schema components that are written in a particular order; and
rewriting the second XML schema type into the unified schema format, including a) at least one of deleting a discretionary component from the second XML schema type that as expressly recited in the second XML schema type and writing a discretionary component to the second XML schema type that was expressly omitted in the second XML schema type and b) rewriting the order of at least one list of components in the second XML schema type into a different predetermined order of the unified format;

generate a first hash number for at least a portion of the first normalized XML schema type;

generate a second hash number for at least a corresponding portion of the second normalized XML schema type; and determine equivalence of the first and second normalized XML schema types by comparing the first and second hash numbers and wherein when the first and second hash numbers match then the first and second XML schema types are indicated as being equivalent; and create a single class collectively representing both the first XML schema type and the second XML schema type based on the determination of equivalence and notwithstanding that the representation of second schema components differ from the representation of the first schema components, the single class compatible with applications utilizing either the first XML schema type or the second XML schema type.

22. The computer program product as recited in claim 21, wherein the rewriting the order of at least one list in the first XML schema type includes placing the at least two schema components into alphabetical order.

23. The computer program product as recited in claim 22, wherein prior to the rewriting the order, it is determined that the order of the at least two schema components is discretionary.

* * * * *